United States Patent [19]
Cole

[11] Patent Number: 5,203,119
[45] Date of Patent: Apr. 20, 1993

[54] AUTOMATED SYSTEM FOR LAPPING AIR BEARING SURFACE OF MAGNETIC HEADS

[75] Inventor: Robert A. Cole, Newark, Calif.

[73] Assignee: Read-Rite Corporation, Milpitas, Calif.

[21] Appl. No.: 673,651

[22] Filed: Mar. 22, 1991

[51] Int. Cl.⁵ .......................................... B24B 49/16
[52] U.S. Cl. .................................. 51/165.77; 51/324; 51/165.71; 51/165.9
[58] Field of Search ............ 51/165 R, 165.71, 165.77, 51/324, 121, 125, 281 R, 165.9; 29/603

[56] References Cited
U.S. PATENT DOCUMENTS

| | | | |
|---|---|---|---|
| 4,457,114 | 7/1984 | Hennenfent et al. | 51/324 |
| 4,517,041 | 5/1985 | Hennenfent et al. | 51/324 |
| 4,536,992 | 8/1985 | Hennenfent et al. | 51/121 |
| 4,912,883 | 4/1990 | Chang | 51/165.71 |
| 4,914,868 | 4/1990 | Church | 51/165.71 |

OTHER PUBLICATIONS

IBM Technical Disclosure Bulletin; "Polishing Apparatus"; Grandison; vol. 13, No. 4 (Sep., 1970).

Primary Examiner—Robert A. Rose
Attorney, Agent, or Firm—N. Kallman

[57] ABSTRACT

An automated system for lapping thin film magnetic heads comprises a lapping fixture positioned in apposition to a rotary lapping plate. A ceramic bar, on which the magnetic heads are deposited and from which air bearing head sliders are fabricated, is attached to an adjustable transfer tool that is secured to a bow yoke holder. The holder is fixed securely on the lapping fixture so that the air bearing surface of the magnetic heads face the surface of the lapping plate. During the lapping process, digital data signals are obtained representative of throat height level of selected heads spaced along the bar. The signals are calibrated and processed by a computer which provides command signals for varying lapping pressure, changing direction of row bow, shifting a weight to achieve proportional lapping along the bar, changing the lapping process to a fine polishing step and forming tapers on the rails of the head sliders.

12 Claims, 6 Drawing Sheets

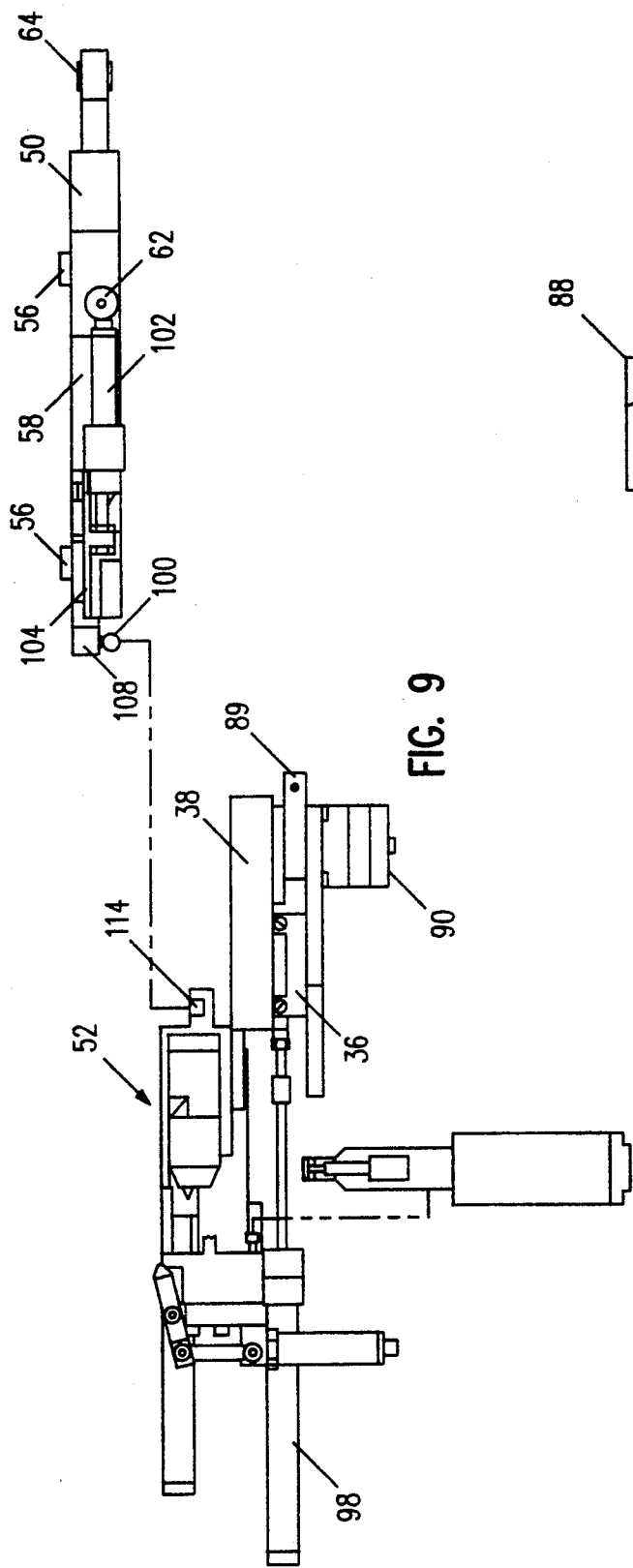
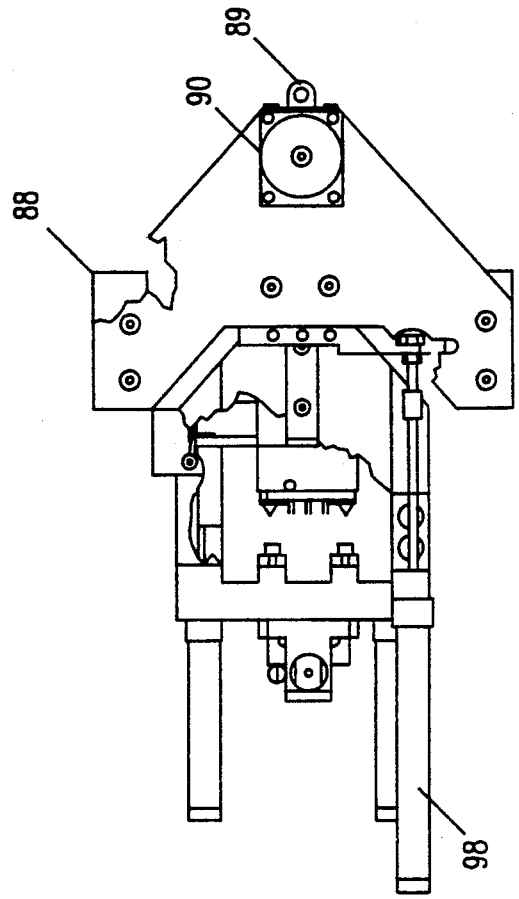
FIG. 9
FIG. 7

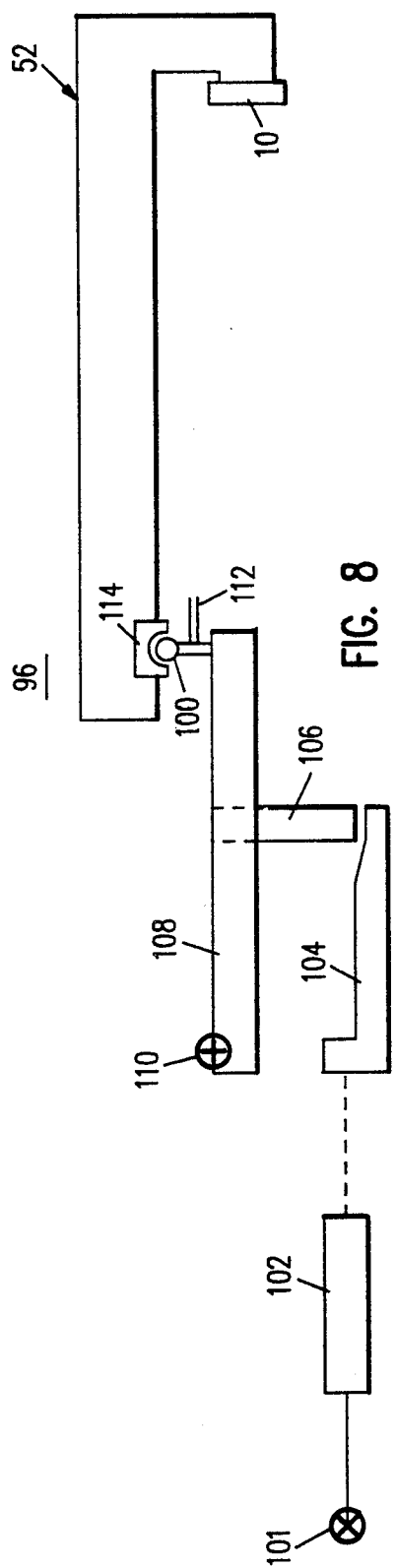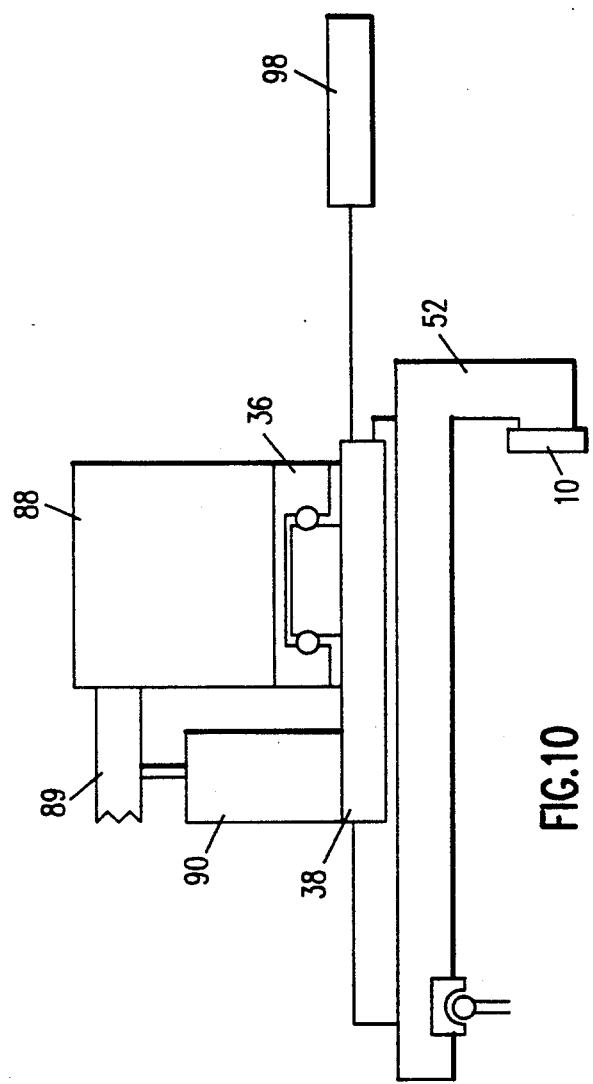

AUTOMATED SYSTEM FOR LAPPING AIR BEARING SURFACE OF MAGNETIC HEADS

CROSS-REFERENCE TO U.S. PATENT AND COPENDING APPLICATION

U.S. patent entitled "Adjustable Transfer Tool for Lapping Magnetic Head Sliders", discloses an adjustable transfer tool having a configured slotted section and a lever element to allow varying the air bearing surface of magnetic head sliders.

Copending patent application Ser. No. 07/675,096 entitled "Throat Height Control During Lapping of Magnetic Heads", filed Mar. 22, 1991 on behalf of George Tang, and assigned to the same assignee, discloses an M-H looper circuit that measures head saturation current to enable the control of throat height during lapping of thin film heads. The subject matter of both patent applications is incorporated herein by reference.

FIELD OF THE INVENTION

This invention relates to a method and apparatus for controlling the manufacture of magnetic heads and in particular to a lapping system used during batch fabrication of magnetic heads.

DESCRIPTION OF THE PRIOR ART

Magnetic heads are used extensively in data processing systems, such as disk drives. During head production, batch fabrication is employed whereby a multiplicity of transducers are deposited in a row on a ceramic bar for lapping, polishing and processing simultaneously. The ceramic bar serves as a support or substrate for the transducers and subsequently is divided into head slider elements. During the manufacture of magnetic heads or head sliders with thin film transducers, the pole tips at which the transducing gap is disposed are ground and lapped to achieve a desired throat height at which optimum data signal processing can be realized. The throat height of all the transducers made during a production run for use with a data storage product must be maintained within a defined limited tolerance.

A problem that exists during the lapping process is row bow, which is a condition wherein the ceramic bar is stressed and assumes an undesirable curvature. As a result, the transducer pole tips that encompass the transducing gap are differently aligned relative to the lapping plate and therefore are lapped at different rates. Apparently this condition would result in different throat heights for the transducers disposed along the ceramic bar. Prior art lapping systems employ optical guides or electrical lapping guides that indicate changes in the electrical and magnetic characteristics of the head circuit, which are used for implementing manual lapping. The prior art approach is time-consuming, subject to operator error, cannot correct for row bow and does not afford optimum production yield.

SUMMARY OF THE INVENTION

An object of this invention is to provide an automated system for lapping magnetic heads that compensates for row bow, achieves a savings in time and cost and realizes an increase in production yield.

Another object of this invention is to provide an automated system for lapping thin film transducers wherein pressure against the air bearing surface of the transducers during lapping is automatically controlled.

According to this invention, a ceramic bar on which a row of thin film magnetic transducers are deposited is attached to a transfer tool. A yoke element, which engages the transfer tool firmly, is mounted to a lapping fixture that is positioned closely adjacent to a rotary lapping plate to implement lapping of the transducers. A printed circuit (PC) board is attached to the transfer tool to allow connection of the head circuitry to measuring circuits, such as the M-H looper referenced above. The measuring circuits provide digital data relating to the magnetic characteristics of the magnetic heads being processed. The digital signals produced by the M-H looper circuits which are representative of the magnetic characteristics of the heads, such as head saturation relative to applied drive current, are used to vary the pressure applied to the air bearing surface of the magnetic heads on the ceramic bar.

BRIEF DESCRIPTION OF THE DRAWING

The invention will be described in greater detail with reference to the drawing in which:

FIG. 7 is a top plan view of the lapping fixture in FIG. 4;

FIG. 8 is a representation of the mechanism used for tapering slider rails, in accordance with this invention;

FIG. 9 is a side view of the lapping fixture of FIG. 4; and

FIG. 10 is a representation of the mechanism used for weight shifting, as implemented in this invention.

Similar numerals refer to similar elements throughout the drawing.

DETAILED DESCRIPTION OF THE PREFERRED EMBODIMENT

Figure 1:
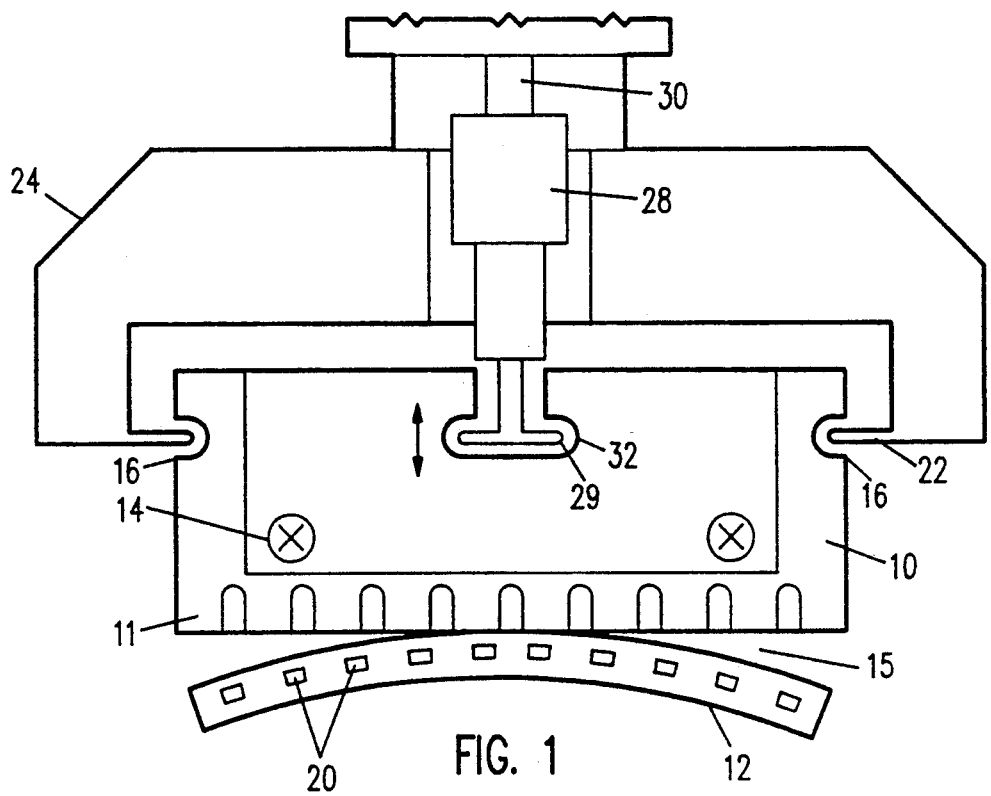
FIG. 1 is a plan view showing an assembly of a transfer tool having a ceramic bar with transducers deposited thereon, illustrated in a row bow condition, and a bow yoke element engaging the transfer tool.

With reference to FIG. 1, a transfer tool 10 is formed as a substantially rectangular block, which may be made of a stainless steel part about two inches long. Apertures 14 are provided for mounting the tool 10 to a lapping fixture 52, (FIG. 4) to enable lapping and machining of a head slider bar 12 made of a ceramic material. Thin film transducer assemblies 20 and electrical contacts 2 are uniformly spaced along the slider bar 12. During fabrication of the magnetic heads, the slider bar 12 which is bonded in place on the top surface of the transfer tool 10 is lapped, sectioned and configured to produce a row of head sliders 1.

Figure 2:
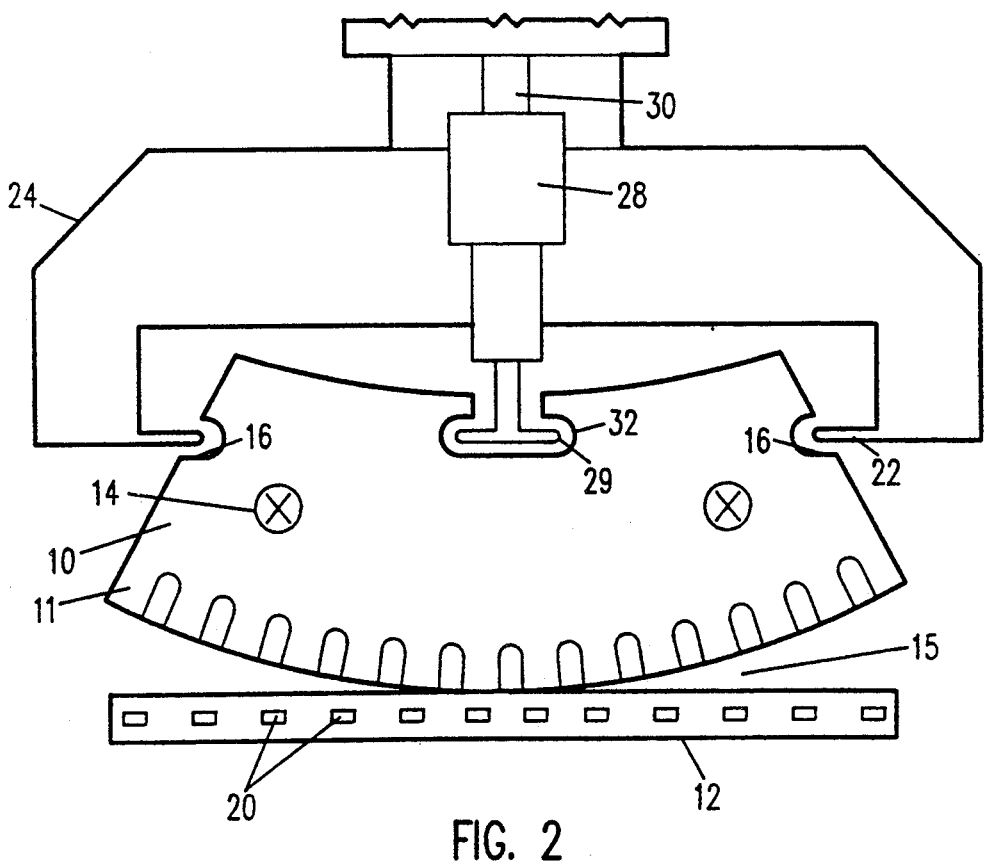
FIG. 2 is a plan view of the assembly of FIG. 1 illustrating the transfer tool being deflected in order to compensate for row bow condition.

During the manufacturing process, stress induced in the material of the head slider bar causes a curvature or bow of the row of sliders. The curvature can be concave or convex, which may be defined respectively as a negative bow or positive bow. FIG. 1 illustrates the assembly with an undesirable row bow of the head slider bar 12. FIG. 2 illustrates the flexing of the transfer tool 10 by varying the pressure applied by the plunger 28 against the transfer 10 tool in order to obtain a collinear head slider bar resulting in uniform throat heights for the row of magnetic heads being processed. To ensure that the sliders are being lapped uniformly so that the throat heights of the thin film transducers are substantially the same, it is necessary to present a collinear array of transducers along the slider bar 12 to the lapping plate 54.

In an implementation of this invention, notched ends 16 of the transfer tool 10 are closely engaged with fingers 22 of a bow yoke element 24. The transfer tool 10 has a central slot 32 in which a plunger 28 is captured. The notches 16 and slot 32 are instrumental in allowing changes in row bow of the tool 10 and attached slider bar 12. The transfer tool 10 and the supporting bow yoke 24 which grasps the tool 10 are mounted and locked to a nonrotary lapping fixture 52, so that the air bearing surfaces of the magnetic transducers 20 are positioned in a closely spaced relation relative to the lapping plate 54 (see FIG. 4). The lapping plate 54 has an abrasive surface that serves to grind and lap the air bearing surfaces of the magnetic heads being processed.

To implement the lapping process the heads 20 are brought into contact with the lapping plate 54. Row bow is adjusted by means of a plunger 28 that is joined to a piston rod 30. The plunger 28 extends through a passageway in the yoke 24 and is captured in a slot 32 in the transfer tool 10. At the bottom of the plunger 28, an enlarged cylindrical portion 29 is disposed within a slot 32 formed in the transfer tool 10 whereby up or down movement of the plunger 28 within the slot can vary the pressure against the area of the tool adjacent to the lower surface of the slot 32. Such variations in the application of pressure result in bending of the transfer tool 10, thus causing the row of heads to become collinear relative to the face of the rotary lapping plate 54.

Figure 4:
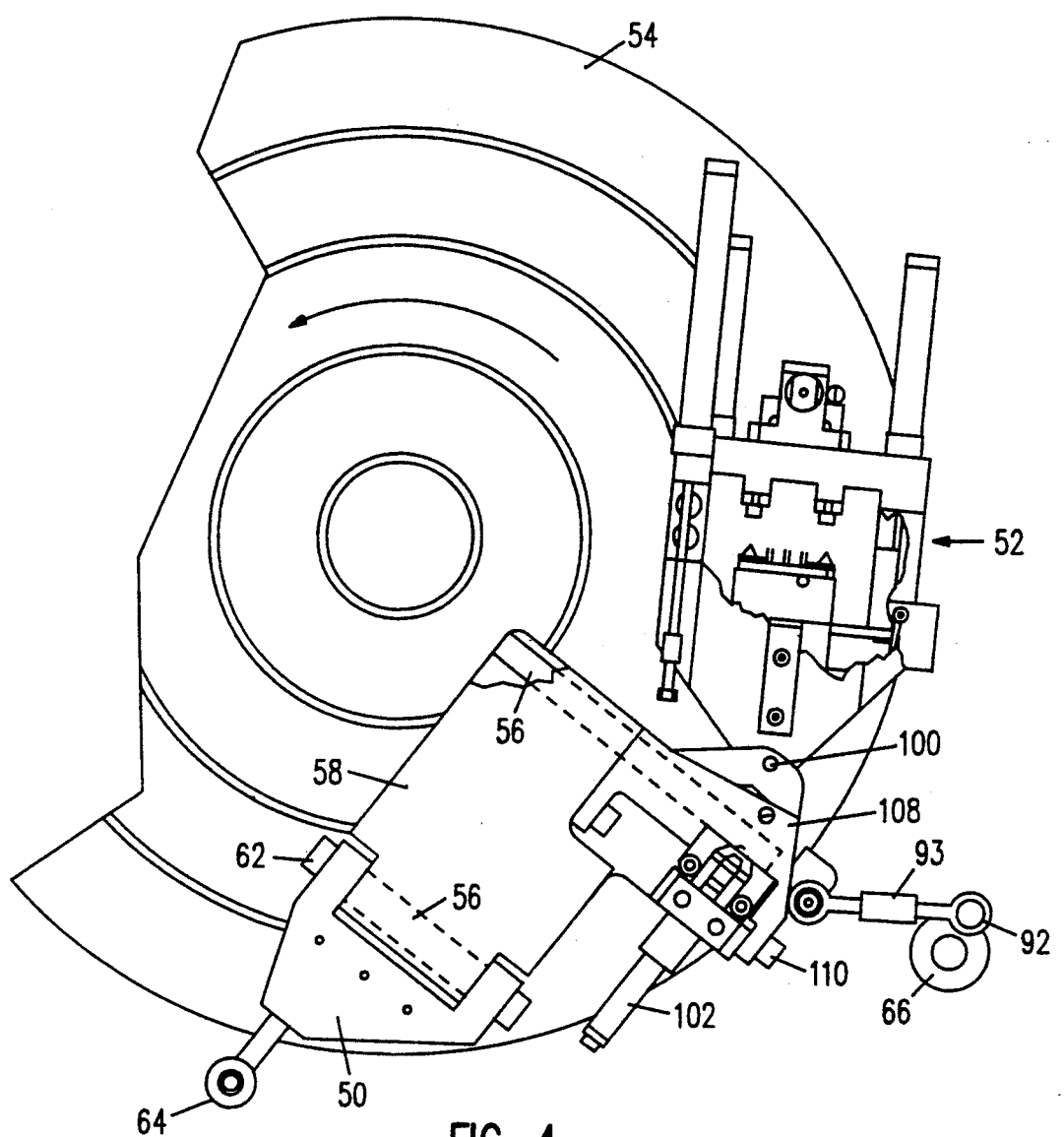
FIG. 4 is a top view representation of the lapping mechanism used with the system of this invention.

With reference to FIGS. 4, 7 and 9 the lapping fixture 52 is mechanically linked to a plate 58. Ceramic feet 56 are attached to the plate 58 and ride on the abrasive lapping plate 54. The lapping fixture 52 is free to move parallel to the longitudinal axis of the ceramic bar 12. One end of the fixture 52 is connected to a tooling ball 100 which in turn connected through a lever part 108 to the plate 58. The plate 58 is coupled to a movable element 50 by a hinge 62. The movable element 50 is mounted to a stationary post 64 that is fixed to the housing of the lapping assembly.

A motor 66 is mechanically connected by a crank 92 and link 97 to the plate 58. When the motor 66 is activated, the plate 58 oscillates so that the lapping fixture 52 is moved arcuately relative to the surface of the rotating lapping plate 54.

As the plate 58 oscillates back and forth, the lapping fixture 52 moves longitudinally relative to the lapping plate 54. In this way, the combined motion of the rotating lapping plate 54 and the lapping fixture 52 results in effectively lapping the air bearing surface of the ceramic slider bar 12 on which the thin film transducers are deposited.

Figure 3:
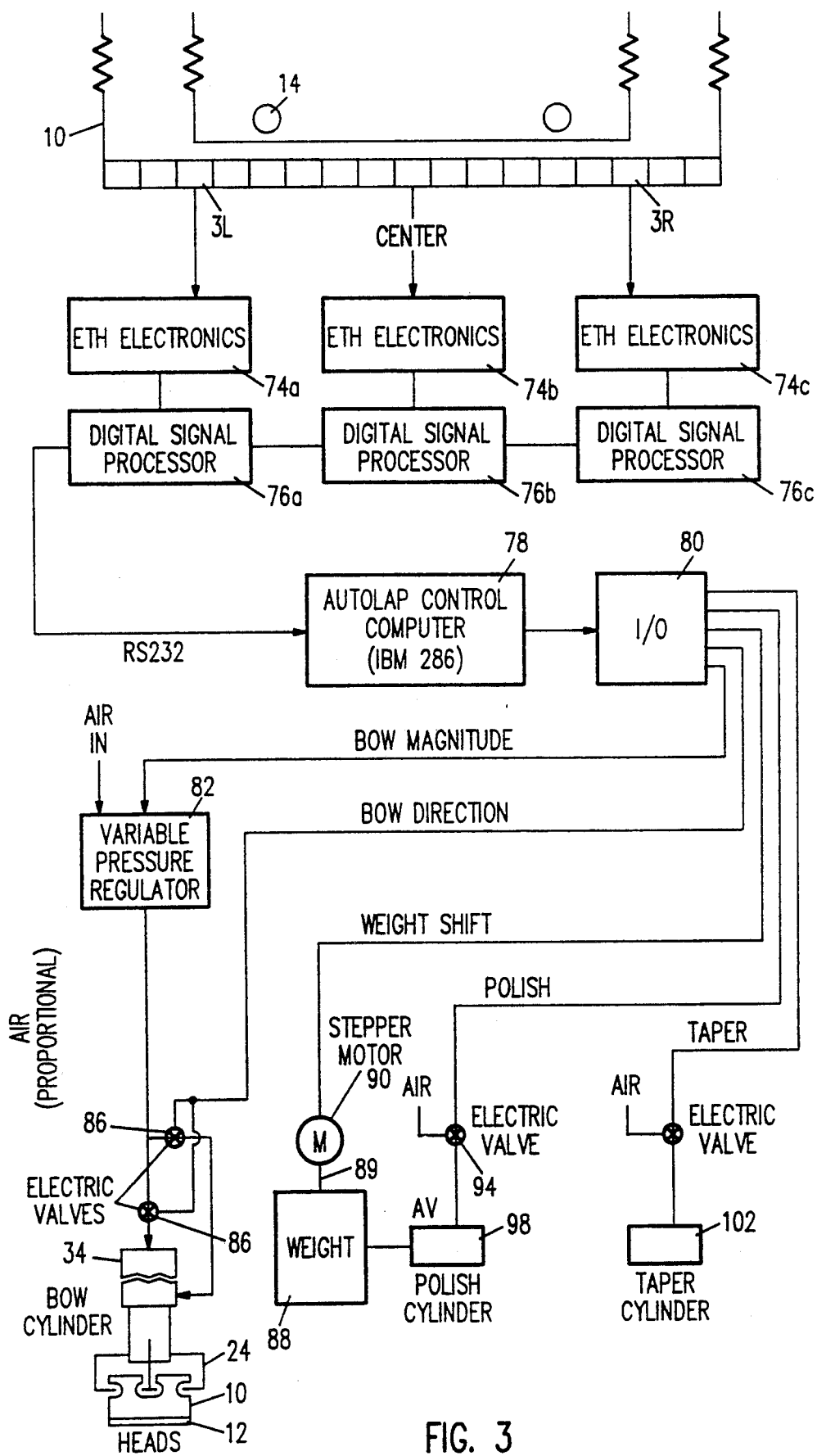
FIG. 3 is a schematic block diagram of the automated lapping system, according to this invention.

To control the pressure applied to the transfer tool 10 so that the slider bar 12 is properly aligned relative to the lapping plate 54, an automatic control system, as illustrated in FIG. 3, is employed. In this implementation of the invention, digital signals are obtained through electronic throat height circuitry connected to three spaced heads 20 on the slider bar 12. One of the selected heads is at the center C, and the other two selected heads 3L and 3R are close to the opposing ends of the bar 12, preferably the third head element from each end of the bar.

Figure 6:
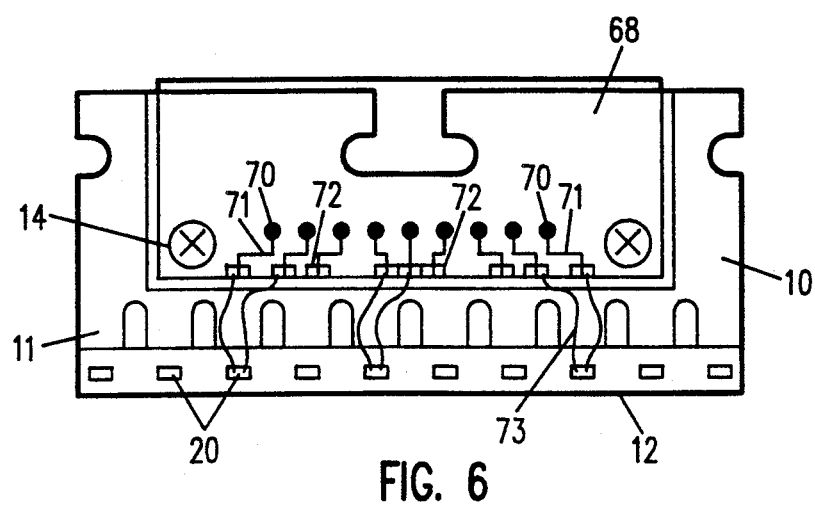
FIG. 6 is a plan view depicting the transfer tool with a printed circuit board attached thereto to provide electrical circuit connections.

As shown in FIG. 6, a PC board 68 is mounted to the transfer tool 10 by means of adhesive. The PC board 68 has probe contacts 70 with leads 71 extending to bond pads 72, which in turn are connected to the circuitry of the three selected heads by two wires 73 to each head. The probe contacts 70 provide a relatively large area for six mechanical probes associated with the electronic circuitry for measuring throat height. During operation of the automatic lapping system, after the transfer tool 10 with the attached PC board 68 are locked to the lapping fixture 52, drive current is applied to the probe contacts 70 to energize the coils of the heads. Separate electronic circuits 74a, 74b, 74c, which preferably are M-H looper circuits such as referenced supra, generate data signals representing the distance from zero throat height of each of the selected heads. The circuits compare the generated data signals to stored data signals representing optimum throat heights for magnetic heads of the same design. The stored data signals were obtained empirically by testing a significant number of such heads and recording the data referenced to throat height. The data signals are digitized and processed in signal processors 76a, 76b, 76c respectively and are passed through an RS232 port to an autolap control computer 78. The computer 78 processes the digital signals and generates control signals that are directed to an I/O card 80. The control signals are used to control (a) the pressure from 0 to 100 pounds of force, for example, for modifying row bow; (b) the direction of change of the row bow; (c) shifting of a weight seated on the lapping fixture; (d) the air cylinder that controls the polishing step after lapping; and (e) the taper finish of the slider 12.

To change the magnitude of the row bow, a control signal from the I/O card 80 is directed to a variable pressure regulator 82, which comprises a current-to-pressure transducer, that has an air inflow and provides an air outflow which is proportional to the amount of pressure needed to modify the row bow, as calculated by the computer 78. The air cylinder 34 moves the piston rod 30 and the attached plunger 28 up or down. Air applied to the cylinder top pushes the piston rod 30 and plunger 28 downwards, whereas air applied to the cylinder bottom pushes the rod and plunger upwards. The direction of movement of the cylinder and thus the direction of change of row bow is controlled by a direction control signal received from the computer 78 and applied through two electric valves 86 to the air cylinder 34. The amount of deflection in either direction of the tool 10 at the air bearing surface of the heads can be controlled in the range of 0–0.000150 inch, by way of example.

In order to increase the amount of lapping and the removal of material at one end of the slider bar while decreasing the amount of removal at the other end of the slider bar, a weight 88 is mounted on orthogonally disposed roller slides 36 and 38 seated on the lapping element, as shown in FIG. 10. The roller slides allow the weight to be shifted in a first direction parallel to the linear direction of the ceramic bar 12 and in a second direction perpendicular to the first direction. In response to a weight shift signal from the computer, the weight which may be a mass of about 1 kilogram is shifted a distance proportional to the amount of lapping needed along sections of the slider bar 12. The weight 88 is moved in a direction parallel to the longitudinal axis of the transfer tool 10 for a distance determined by the computer. To accomplish the weight shift, a control signal is sent to a stepper motor 90, which is mechanically connected by a crank 89 to the weight 88 to allow shifting the weight incrementally in a direction that will result in an increase of lapping pressure applied towards one end of the slider bar and a decrease of lapping pressure towards the other end of the slider bar.

After completing the lapping process, the weight 88 is shifted away from the slider bar 12 by the polish air cylinder 98 and a polish finishing step is initiated. The computer command signal opens an electric valve to allow a polishing compound to be distributed across the lapping plate 54. The polishing operation in effect washes away any residue of abrasive diamond slurry used during lapping. The duration of the polishing step runs about one minute for the implementation disclosed herein.

After the lapping and polishing steps are completed, the lapping fixture 52 and the transfer tool 10 and attached slider bar 12 are tilted at a predetermined angle. The head sliders spaced along the slider bar 12 are configured with air bearing rails that extend from a leading edge to a trailing edge of the slider at which end the thin film transducers are deposited, as is well known in the art. The tool 10 and slider bar 12 are tilted by a mechanism 96, In the tilted position, the abrasive lapping plate 54 is used to form the tapers on the slider rails to enhance the aerodynamics of the air bearing slider structure.

With reference to FIG. 8, a mechanism for forming the tapers on the slider rails includes an air valve 101 that supplies pressure to an air cylinder 102. The air cylinder causes a taper slide cam 104 to move forward. A lifter 106 which rides on the slope or tapered portion of the cam 104 rises to lift a lever 108 that is tied at one end to a fixed pivot 110. At its other end, the lever 108 supports a rod 112 and attached ball 100, so that as the lever is rotated about the pivot 110, the ball 100 is engaged within a socket 114 formed in the lapping fixture 52. As a result, the fixture 52 to which the transfer tool 10 and slider bar 12 are mounted is tilted, whereby the end portions of the slider rails are ground by the lapping plate 54 to a desired angle.

Figure 5:
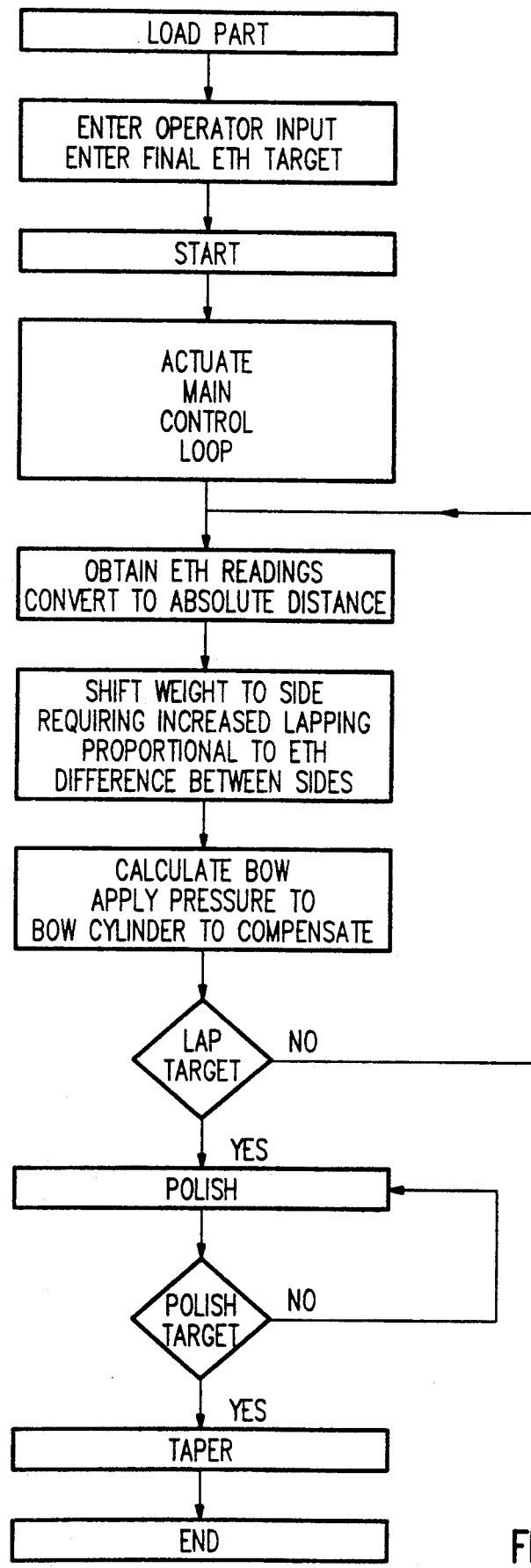
FIG. 5 is a logic flow diagram to aid in the explanation of the invention.

The sequence of operation of the automated lapping system is set forth in the logic diagram of FIG. 5. By virtue of the automated system of this invention, a rapid and precise lapping and polishing of thin film magnetic heads are achieved with a significant increase in production yield. Uniformity of throat height level for a production run of thin film heads is realized so that optimum transducing performance of the heads is obtained. The rocking forces which are present with conventional lapping fixtures are reduced so that a single point and direction of resolution of lapping forces results.

It should be understood that the invention disclosed herein is not limited to the specific parameters or values given by way of example and that modifications may be made within the scope of the invention. For example, the bow yoke element may have recesses or apertures formed therein and the transfer tool may have extensions or fingers for engaging said recesses or apertures. In addition, an electrical solenoid or other actuating means may be used instead of pneumatic means to flex the transfer tool.

What is claimed is:

1. An automated system for laping thin film magnetic heads disposed in a row on a ceramic bar comprising:
   an adjustable transfer tool to which said bar is mounted, said transfer tool having recesses or apertures;
   a lapping assembly including a rotary lapping plate;
   means for securing said bar in apposition to said lapping plate, said securing means comprising a bow yoke element having means for engaging said transfer tool including fingers for engaging said recesses or apertures;
   means coupled to said heads for generating data signals representing throat height during the lapping process;
   a data processor coupled to said signal generating means for producing command signals in response to said data signals; and
   means coupled to said data processor for automatically varying the pressure applied to said ceramic bar relative to said lapping plate in response to a command signal from said processor.

2. An automatic system for lapping thin film magnetic heads disposed in a row on a ceramic bar comprising:
   an adjustable transfer tool to which said bar is mounted,;
   a lapping assembly including a rotary lapping plate;
   means for securing said bar in apposition to said lapping plate, said securing means comprising a bow yoke element having recesses or apertures formed therein, said transfer tool comprising fingers for engaging said recesses or apertures;
   means coupled to said heads for generating data signals representing throat height during the lapping process;
   a data processor coupled to said signal generating means for producing command signals in response to said data signals; and
   means coupled to said data processor for automatically varying the pressure applied to said ceramic bar relative to said lapping plate in response to a command signal from said processor.

3. A system as in either claim 1 or 2, further including a mechanism for forming tapers on said ceramic bar comprising a lapping fixture for moving parallel to said ceramic bar, an oscillating hinged plate linked to said fixture for moving said fixture relative to said lapping plate, a socket formed in said lapping fixture, a ball disposed within said socket, wherein said fixture is tilted so that the end portions of said slider rails are ground by said lapping plate to a desired angle.

4. A system as in either claim 1 or 2, wherein said pressure varying means includes a mechanical element connected to a piston means, said mechanical element being engaged with said transfer tool for applying upward or downward pressure to said transfer tool.

5. A system as in claim 4, wherein said pressure varying means comprises a variable pressure regulator; and a double acting air cylinder coupled to said regulator for supplying varying air pressure, wherein said piston means is responsive to said varying air pressure.

6. A system as in either claim 1 or 2, wherein said pressure varying means comprises electrical actuating means for flexing said transfer tool.

7. A system as in either claims 1 or 2, further including an input/output circuit coupled to said data processor for channeling said command signal for implementing head processing functions.

8. A system as in claim 7, wherein said lapping assembly includes a lapping fixture having a movable weight positioned thereon; and actuator means mechanically coupled to said weight for shifting said weight in a direction parallel to the longitudinal axis of said transfer tool in response to a command signal from said input/output circuit.

9. A system as in claim 7, including a weight shift actuator that is activated for shifting said weight away from said ceramic bar so that said magnetic heads can be polished in different proportional rates in response to a command signal from said input/output circuit.

10. A system as in claim 7, wherein said magnetic heads comprise air bearing head sliders with longitudinal rails, including means for varying the attitude or tilt of said transfer tool and bar relative to said lapping plate in response to a command signal from said input/output circuit to enable forming tapered sections on said rails.

11. A system as in either claim 1 or 2, wherein said lapping assembly comprises a movable lapping fixture; and further including motor means coupled to said fixture for moving said fixture relative to said lapping plate.

12. A system as in either claim 1 or 2, wherein said transfer tool is formed with a slotted portion.

* * * * *